United States Patent [19]

Even

[11] Patent Number: 4,864,173

[45] Date of Patent: Sep. 5, 1989

[54] ASSEMBLY FORMED BY AN ELECTROMAGNETIC RETARDER AND ITS ELECTRIC SUPPLY MEANS

[75] Inventor: Denis Even, Cergy Pontoise, France

[73] Assignee: Labavia S.G.E., Montigny Le Bretonneux, France

[21] Appl. No.: 311,978

[22] Filed: Feb. 17, 1989

[30] Foreign Application Priority Data

Feb. 25, 1988 [FR] France .................. 88 02301

[51] Int. Cl.⁴ .............................. H02K 49/00
[52] U.S. Cl. ............................... 310/93; 310/105; 310/52; 310/54; 310/68 R; 310/112; 188/158; 188/161
[58] Field of Search ............ 310/52, 54, 62, 63, 310/68 R, 68 D, 105, 112, 113, 114, 265, 93; 188/158, 161, 264 D

[56] References Cited

U.S. PATENT DOCUMENTS 3,184,626  5/1965  Luenberger .................. 310/54

FOREIGN PATENT DOCUMENTS 1086335  8/1960  Fed. Rep. of Germany ...... 310/105
1467310  1/1966  France .
6032503  2/1985  Japan ............................ 310/93

Primary Examiner—Patrick R. Salce
Assistant Examiner—Clayton E. LaBalle
Attorney, Agent, or Firm—Larson and Taylor

[57] ABSTRACT

An assembly is provided formed by an electromagnetic vehicle retarder and its electric supply means, where the retarder has a rotor (2) mounted on the output shaft of the gearbox of the vehicle and a stator (13) cantilevered on the casing of this gearbox. The armature (5) of the retarder forms part of the stator and is cooled by water and its inductor (4), which forms part of the rotor, is fed electrically by an alternator whose rotor (13) and stator (14) are secured respectively to the rotor (2) and the stator (3) of the retarder.

4 Claims, 2 Drawing Sheets

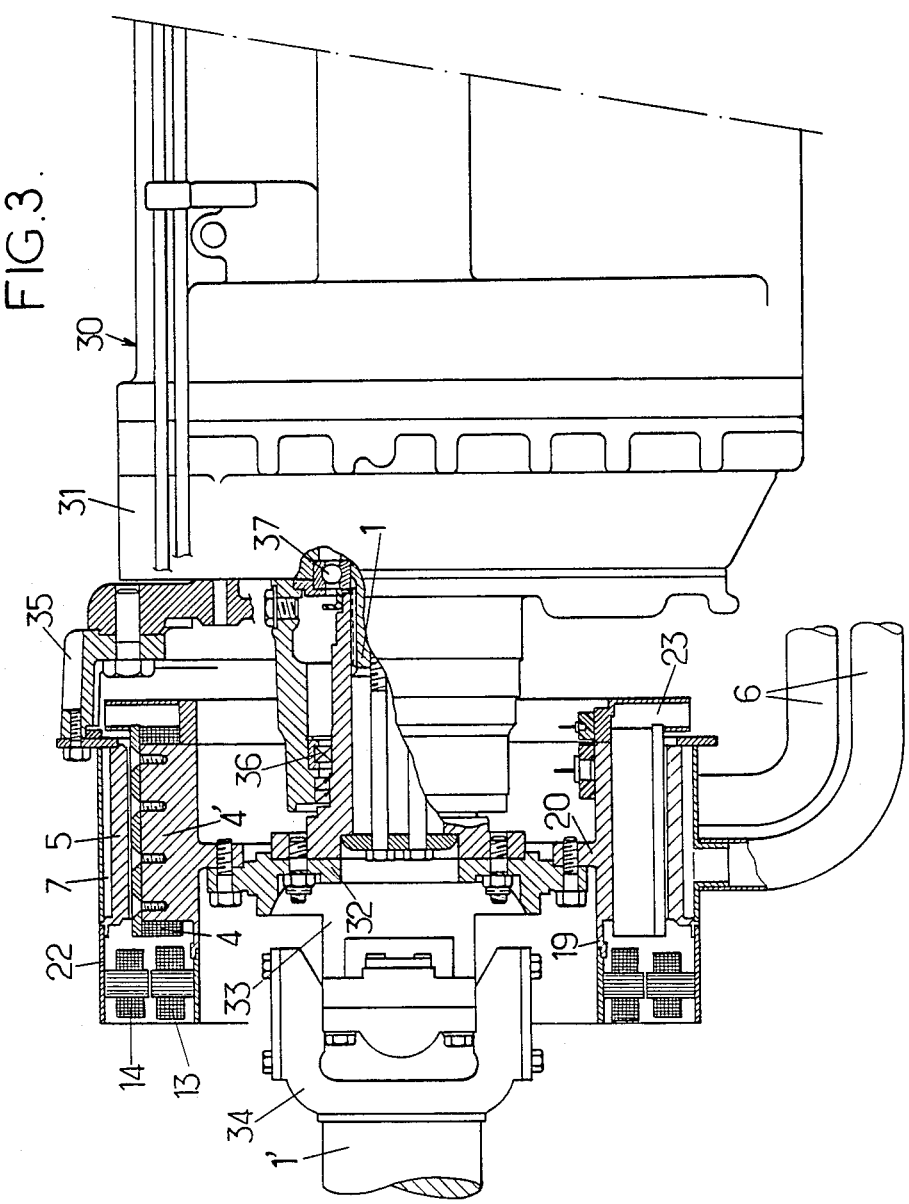

ASSEMBLY FORMED BY AN ELECTROMAGNETIC RETARDER AND ITS ELECTRIC SUPPLY MEANS

The invention relates to assemblies formed by an electromagnetic retarder, intended to brake a vehicle transmission shaft, and its electric supply means, which assemblies comprise a stator through which the shaft passes, which is centred in this stator by appropriate guide means and a rotor fastenable with the shaft so as to present an external cylindrical face in the vicinity of an internal cylindrical face of the stator with interpositioning of an airgap of small thickness, the rotor comprising an inductor, with electric wire coils, capable of generating, when electrically energized, a magnetic field with alternate distribution in an annular ferromagnetic part of the stator forming the armature and associated with a liquid cooling circuit, the electric supply for the coils being provided by means of a multiphase alternator, particularly three phase, whose armature forms part of the above rotor and is connected to said coils by means of a rectifier also forming part of said rotor.

Such an assembly has been described in the French patent 1 467 310. In this assembly, the retarder is mounted on a section, of the vehicle transmission shaft concerned, relatively distant from the engine; this section is itself mounted between two ball bearings carried by two transverse flanges defining the axial ends of the stator, then in the form of a cylindrical box, and is connected to the rest of the shaft by two homocinetic joints.

The rotor of the apparatus is then in the form of a solid core fixed to said central shaft portion and extended radially outwardly by the inductor coils, small in number (typically six).

Such a construction does not lend itself to direct cantilever mounting on the output of the gearbox of the vehicle, wherein the stator is cantilevered on the casing of the gearbox and the rotor is cantilevered on a stub shaft extending from said gearbox, this rotor being further fast with a cardan coupling element for connecting it to the rest of the transmission shaft.

Now, such cantilevered mounting, which has been described in the U.S. Pat. No. 3,496,396, is particularly precious since it makes possible the use of an electromagnetic retarder on a very short transmission such as those equipping semi-trailer tractors or coaches with advanced cabin.

The purpose of the present invention is especially to make retarders of the above kind such that they lend themselves to such cantilevered mounting.

For this, in accordance with the invention, the number of inductor coils of the retarder and that of the inductor poles of the alternator are both greater than or equal to twelve, the stator ring formed by the inductor poles of the alternator surrounds the rotor armature of this alternator with a small clearance and the two rotor rings formed respectively by the inductor coils of the retarder and by the armature of the alternator are juxtaposed axially on the external face of a same inner sleeve of relatively large inner diameter extended on the inside by a transverse connection flange.

This flange lends itself to direct connection to a plate or similar fast both with the output shaft of the gearbox of the vehicle and with a cardan coupling element, which may itself be housed at least partially in the large space inside the sleeve.

As for the stator assembly, it is relatively light since it no longer comprises relatively bulky and long retarder inductor coils: it lends itself then quite well to cantilever fitting on the casing of the gearbox.

It may be further observed that the above mounting makes it possible to place the stator armature of the retarder, to be cooled by liquid, very close to the engine of the vehicle and in particular to the normal water cooling circuit thereof.

In preferred embodiments, recourse is further had to one and/or other of the following arrangements:

the axial end of the rotor of the retarder, the furthest from the rotor of the alternator, is extended axially by a finned structure for ventilation of the retarder stator, the two stator rings formed respectively by the liquid cooled retarder armature and by the inductor poles of the alternator are juxtaposed axially on the internal cylindrical face of the same cylindrical casing coaxial with the internal sleeve, the number of inductor coils of the retarder is equal to 18 and the number of inductor poles of the alternator is equal to 24.

The invention comprises, apart from these main arrangements, certain other arrangements which are preferably used at the same time and which will be more explicitly discussed hereafter.

In what follows, one embodiment of the invention will be described with reference to the accompanying drawings in a way which is of course in no wise limitative.

FIG. 1 of these drawings shows schematically the assembly, constructed in accordance with the invention, of an electromagnetic vehicle retarder and its electric energization means.

FIG. 3 shows schematically the fitting of such a retarder to the gearbox of the vehicle.

Figure 1:
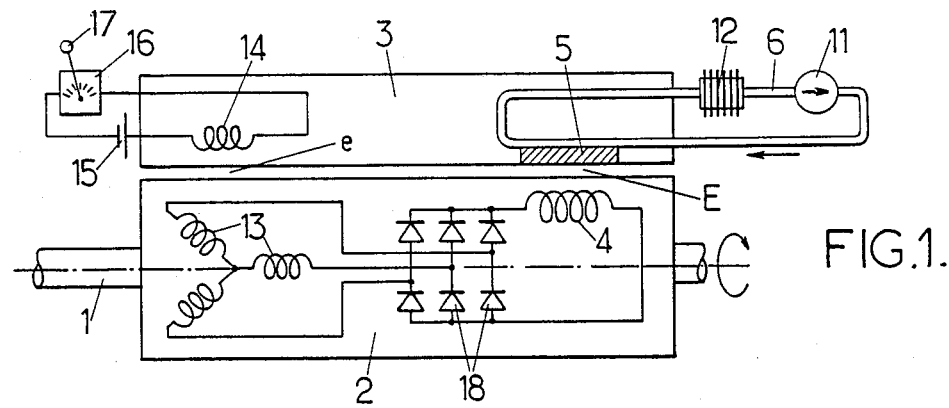

The electromagnetic retarder considered is intended to slow down the rotating shaft of a vehicle, preferably of the "heavy vehicle" type.

In a way known per se, this retarder comprises a rotor 2 fast for rotation with the output shaft 1 of the gearbox 30 of the vehicle and a stator 3 cantilevered on the casing 31 of this gearbox.

But contrary to what is usually contemplated, it is here the inductor which is mounted for rotation, the armature being fixed.

In other words:

the electric wire windings or coils 4 which conduct the electric current for energization of the retarder and which, with radial cores 4' which they surround, define a ring of inductor poles with alternating polarities step by step, form part of rotor 2, and the ferromagnetic material annular piece 5 which forms the armature and in which the eddy currents are generated which cause braking and heating form part of stator 3.

This annular piece 5 is formed by a cylindrical drum surrounding the inductor with interpositioning of a cylindrical air-gap E.

Since this piece 5 is here fixed, it may be readily cooled by a liquid stream since it is not necessary to use special joints for sealing at the level of connections between two parts in relative movement.

For this, a liquid circuit 6 is provided comprising a section 7 which extends directly along the face, of the induced piece 5, opposite the air-gap E.

More precisely, said section 7 is here formed by a duct extending helically about the drum 5, which duct is ended at its ends by two inlet 8 and outlet 9 connections.

To improve the heat exchange between drum 5 and the liquid flowing in duct 7, hollows or reliefs such as annular or helical ridges 10 may be provided on the face of the drum defining a wall of said section.

Such hollows or reliefs may also be provided on the other walls of said section.

In a variant, the circuit section 7 is formed by a simple annular water jacket defined by two coaxial cylindrical walls joined together at their ends by two transverse washers and by a radial longitudinal dividing wall separating the inlet from the outlet.

Cooling circuit 6 comprises, in addition to section 7, a drive pump 11 and an external heat exchanger 12, such as a finned radiator, for dissipating to the outside the heat carried by the flowing liquid.

This liquid is advantageously formed by water to which an anti-freeze is added.

Pump 11 and exchanger 12 are advantageously the water pump and the radiator which form part of the normal cooling circuit of the engine of the vehicle: it should in fact be noted that, during operation of the retarder, the engine releases little heat so that its cooling needs are then reduced; in addition, because the retarder is mounted on the gearbox of the vehicle, it is very close to said normal cooling circuit.

The axes of coils 4 which define the inductor poles here extend radially about the axis of the apparatus.

Since this inductor is rotary, it is advisable to provide special means for supplying its coils 4 with electric current.

For this, a rotary electricity generating machine is used whose rotor is fast with that 2 of the retarder.

As a matter of fact, when a need exists for slowing down shaft 1, the latter is rotating: unused energy corresponds to such rotation of shaft 1 and a portion of this energy is here transformed into the electric current required for feeding the inductor of the retarder.

The two following advantages are thus obtained at one and the same time:

the inductor of the retarder is supplied with power with a very small supply of external electric energy, this energy being limited to that required for supplying the energizer of the generator with power: in the present case of a vehicle retarder, the energization energy taken from the battery of the vehicle is of the order of 30% only of that required for supplying the retarder in the usual constructions and may even be appreciably lower, the generation of the electric current for feeding the inductor of the retarder itself consumes a certain mechanical energy which is taken from the shaft to be slowed down: such consumption therefore itself contributes to braking said shaft.

In the preferred embodiment illustrated, the generator is an alternator comprising:

a three phase rotor 13 forming the armature of this alternator, and an inductor stator 14 with multiple poles surrounding the rotor 13 with a small clearance forming an air-gap e.

The electromagnetic connection between this rotor 13 and stator 14 is provided exclusively through this air-gap e, without any mechanical contact of the ring and brush type.

The multiple poles of the stator are created by a ring of small electromagnets of alternating polarities connected to a DC source 15 such as the battery of the vehicle.

This connection is provided through a regulation circuit 16 for adjusting at will the intensity of the energization current of inductor 14 and consequently the intensity of the electric current generated by the alternator, and finally the braking torque applied to the rotor of the retarder and so to shaft 1.

This circuit 16 advantageously comprises a manual control member 17.

The alternating current collected at the terminals of rotor 13 is rectified by an appropriate bridge 18 before being applied to the coils 4 of the retarder.

Of course, the assembly of components 18 forms part of the rotor 2 just as coils 4 and armature 13.

Figure 2:
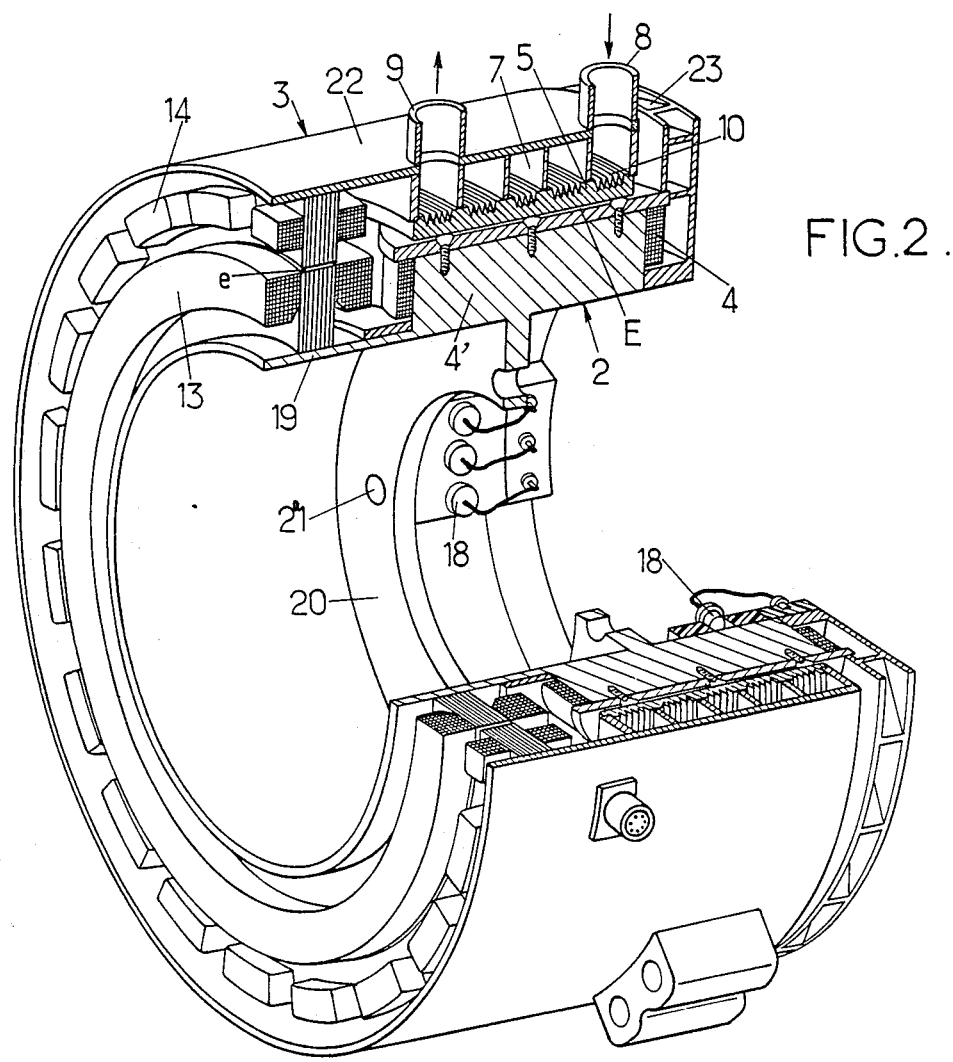
FIG. 2 shows the same assembly in a perspective view, with parts cut away.

As can be seen in FIG. 2, this armature 13 is secured to the coils 4 of the retarder, the assembly of these elements being mounted on a same sleeve 18 extended inwardly by a transverse flange 20 itself formed with fixing holes 21 and forming a flange for connection to a plate 32 fast with shaft 1. This sleeve 19 may form a single piece with the cores 4' and with flange 20.

Plate 32 is in its turn secured to one of the two jaws 33 of a cardan coupling whose other jaw 34 is fast with the main section 1' of the transmission shaft: as can be seen in FIG. 3, these two jaws 33 and 34 are freely housed inside the tube formed by sleeve 19.

The stator 14 is mounted inside a fixed sleeve 22 defining the outside of the above duct section 7: it is this sleeve 22 which is cantilevered to casing 31 of gearbox 30 by means of an apertured frame in the form of a bell 35 such as a ring of arms.

Of course, the output shaft 1 of the gearbox is strictly centred therein, more particularly by means of bearings 36, 37, so that the rotor 2 and stator 3 are centered with respect to each other and so that the above annular air-gaps E and e are formed therebetween.

In FIGS. 2 and 3, a finned structure 23 can be seen forming a ventilator and fixed to the axial end, of rotor 2, the furthest away from armature 13 : this structure makes it possible to feed a stream of cooling air between the coils 4 of the retarder, which contributes to the removal of the heat generated by drum 5.

The number of inductor coils 4 and that of poles 14 of the generator is relatively high, namely at least 12, so as to free inside the machine a large diameter space for the passage of the shaft 1 to be slowed down : in fact, the higher these numbers, the easier it is to give small radial lengths to the corresponding coils and poles ; these two numbers are for example here respectively 18 and 24.

Following which, and whatever the embodiment adopted, an electromagnetic retarder is finally obtained whose construction follows sufficiently from the foregoing.

The operation of this retarder is very readily controlled by simple energization of the fixed inductor 14 of the generator, which energization is preferably controlled by means of member 17.

Said retarder has numerous advantages with respect to those known heretofore and in particular the following :

its cantilevered mounting on gearbox 30 makes it possible to use it even for very short transmissions, cooling of the fixed armature 5 of the retarder, by a liquid stream, is easy because of its proximity to the normal water circuit of the vehicle and it is extremely efficient, which makes it possible to obtain an excellent retarding torque at cruising speed since this torque is all the higher the lower the temperature of the armature, the energy taken from battery 15 or another DC source is relatively low since this energy is limited to that required for feeding the inductor 14 of the generator, the power supply for the inductor coils 4 of the retarder being integrally generated from rotationn of shaft 2; in practice, this energy taken from the battery is generally less than a third of that required for constructions with rotating armature, energization of the retarder is progressive and continuous, which results in a similar variation of the braking torque exerted by said retarder on the shaft to be braked.

As is evident, and as it follows moreover already from what has gone before, the invention is in no wise limited to those of its modes of application and embodiments which have been more especially considered ; it embraces, on the contrary, all variants thereof, particularly :

those where the alternator (13, 14) is a multi-phase type other than three phase, particularly of the two phase or six phase type, those in which the inner face of the inner sleeve (19) is not cylindrical, being for example bell mouthed towards its end opposite the gearbox (30), those where the external face of the external sleeve (22) is not cylindrical, being for example convergent or divergent towards its end opposite the gearbox (30), those where one and/or other of the two sleeves (19, 20) is formed of several elements fixed axially one on the other, e.g. by mutual fitting together as shown in figure 3.

I claim:

1. Assembly formed by an electromagnetic retarder, intended to brake a rotary shaft (1), and its electric supply means, comprising a stator (3) through which the shaft passes, which is centered in this stator by appropriate guide means and a rotor (2) fastenable with the shaft so as to present an external cylindrical face in the vicinity of an internal cylindrical face of the stator with interpositioning of an airgap (E) of small thickness, the rotor comprising an inductor, with electric wire coils (4), capable of generating, when electrically energized, a magnetic field in an annular ferromagnetic part of the stator forming the armature and associated with a liquid cooling circuit (6), and the electric supply for the coils (4) being provided by means of a multiphase alternator, particularly three phase, whose armature (13) forms part of the above rotor (2) and is connected to said coils (4) by means of a rectifier (18) also forming part of said rotor (2), characterized in that the number of inductor coils (4) of the retarder and that of the inductor poles (14) of the alternator are both greater than or equal to twelve, in that the stator ring formed by the inductor poles (14) of the alternator surround the rotor armature (13) of this alternator with a small clearance (e) and in that the two rotor rings formed respectively by the inductor coils (4) of the retarder and by the armature (13) of the alternator are juxtaposed axially on the external face of a same inner sleeve (19) of relatively large inner diameter extended on the inside by a transverse connection flange (20).

2. Assembly according to claim 1, characterized in that axial end, of the rotor (2) of the retarder, the furthest from the rotor (13) of the alternator, is extended axially by a finned structure (23) for ventilation of the retarder stator (3).

3. Assembly according to claim 1, characterized in that the two stator rings formed respectively by the liquid cooled retarder armature (5) and by the inductor poles (14) of the alternator are juxtaposed axially on the internal cylindrical face of the same cylindrical casing (22) coaxial with the internal sleeve (19).

4. Assembly according to claim 1, characterized in that the number of inductor coils (4) of the retarder is equal to 18 and the number of inductor poles (14) of the alternator is equal to 24.

* * * * *